United States Patent
Doken

(10) Patent No.: US 11,722,867 B2
(45) Date of Patent: Aug. 8, 2023

(54) SYSTEMS AND METHODS TO DETERMINE MOBILE EDGE DEPLOYMENT OF MICROSERVICES

(71) Applicant: Verizon Patent and Licensing Inc., Basking Ridge, NJ (US)

(72) Inventor: Serhad Doken, Bryn Mawr, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 65 days.

(21) Appl. No.: 17/149,351

(22) Filed: Jan. 14, 2021

(65) Prior Publication Data
US 2022/0225065 A1    Jul. 14, 2022

(51) Int. Cl.
| | |
|---|---|
| G06F 15/173 | (2006.01) |
| H04W 4/50 | (2018.01) |
| H04L 41/5009 | (2022.01) |
| H04L 41/5051 | (2022.01) |
| H04W 28/08 | (2023.01) |
| H04L 67/63 | (2022.01) |

(52) U.S. Cl.
CPC .......... *H04W 4/50* (2018.02); *H04L 41/5009* (2013.01); *H04L 41/5051* (2013.01); *H04L 67/63* (2022.05); *H04W 28/0992* (2020.05)

(58) Field of Classification Search
CPC .... G06F 11/3466; G06F 9/505; G06F 9/5083; H04L 41/5009; H04L 41/5051; H04L 41/5025; H04L 67/63; H04L 67/10; H04L 41/5054; H04L 63/1408; H04W 4/50; H04W 28/0992; H04W 40/20
See application file for complete search history.

(56) References Cited

U.S. PATENT DOCUMENTS

| | | | |
|---|---|---|---|
| 11,032,164 B1* | 6/2021 | Rothschild | H04L 41/5051 |
| 11,184,236 B2* | 11/2021 | Guim Bernat | G06F 9/5061 |
| 2018/0295485 A1* | 10/2018 | Jalkanen | H04W 12/106 |
| 2018/0331905 A1* | 11/2018 | Toledo | H04L 43/0882 |
| 2019/0042318 A1* | 2/2019 | Ljung | H04W 8/26 |
| 2019/0124496 A1* | 4/2019 | Ye | H04W 8/20 |
| 2019/0208007 A1* | 7/2019 | Khalid | H04L 67/1021 |
| 2020/0142735 A1* | 5/2020 | Maciocco | H04L 63/1408 |
| 2020/0167205 A1* | 5/2020 | Guim Bernat | H04L 9/3213 |
| 2021/0014114 A1* | 1/2021 | Doshi | H04L 41/5019 |
| 2021/0014133 A1* | 1/2021 | Maciocco | H04L 41/5009 |
| 2022/0038554 A1* | 2/2022 | Merwaday | H04L 67/63 |
| 2022/0138003 A1* | 5/2022 | Bernat | H04L 9/0637 |
| | | | 718/104 |

* cited by examiner

*Primary Examiner* — Dustin Nguyen
*Assistant Examiner* — Hao H Nguyen

(57) ABSTRACT

A device may include a processor configured to determine latency budgets for particular microservices for an application associated with a user equipment (UE) device, wherein the microservices are deployed in a cloud computing center. The processor may be further configured to determine that a measured latency for a particular microservice has exceeded a latency budget for the particular microservice by at least a latency budget threshold; deploy the particular microservice on a Multi-Access Edge Computing (MEC) network associated with a base station servicing the UE device, based on determining that the measured latency for the particular microservice has exceeded the latency budget for the particular microservice by at least the latency budget threshold; and send a recommendation to the UE device to use the particular microservice deployed at the MEC network.

20 Claims, 11 Drawing Sheets

SYSTEMS AND METHODS TO DETERMINE MOBILE EDGE DEPLOYMENT OF MICROSERVICES

BACKGROUND INFORMATION

To satisfy the needs and demands of users of mobile communication devices, providers of wireless communication services continue to improve and expand available services and networks used to deliver such services. One aspect of such improvements includes the development of wireless access networks and options to utilize such wireless access networks. A wireless access network may manage a large number of user devices that use different types of services and experience various conditions. Managing all various types of network connections under different conditions poses various challenges.

DETAILED DESCRIPTION OF PREFERRED EMBODIMENTS

Figure 1:
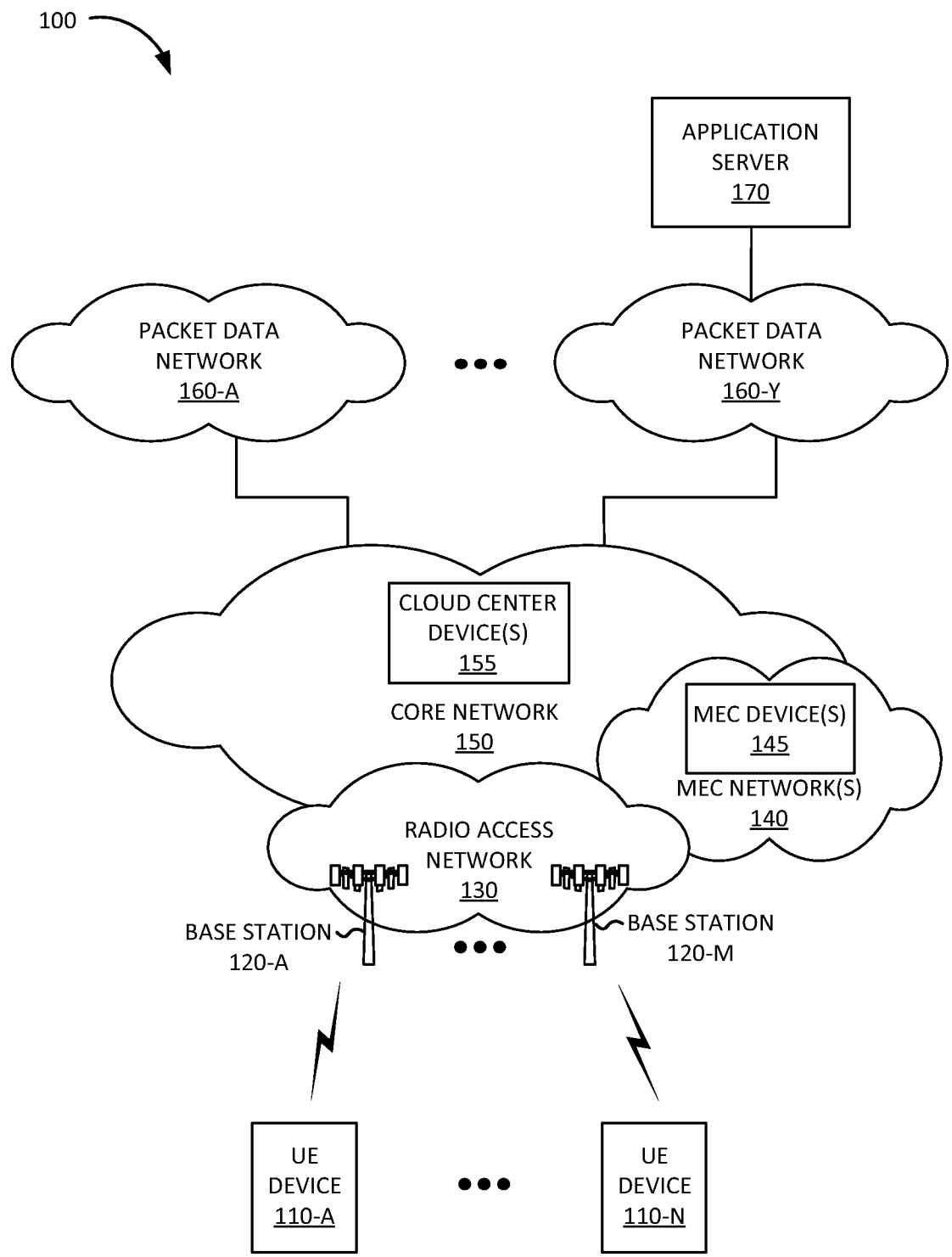
FIG. 1 illustrates an environment according to an implementation described herein.

The following detailed description refers to the accompanying drawings. The same reference numbers in different drawings identify the same or similar elements.

As communication networks and services increase in size, complexity, and number of users, management of the communication networks has become increasingly more complex. One way in which wireless networks are continuing to become more complicated is by incorporating various aspects of next generation networks, such as 5th generation (5G) mobile networks, utilizing high frequency bands (e.g., 24 Gigahertz, 39 GHz, etc.), and/or lower frequency bands such as Sub 6 GHz, and a large number of antennas. 5G New Radio (NR) radio access technology (RAT) may provide significant improvements in bandwidth and/or latency over other wireless network technology. Additionally, a 5G core network supports and manages 5G radio access networks (RAN) that include base stations, providing various services and enabling connections to other networks (e.g., connections to the Internet, etc.). As an example, a 5G core network may provide support for enhanced Mobile Broadband (eMBB), ultra reliable low latency communication (URLLC), massive Machine Type Communication (mMTC), and/or other types of communications.

Another enhancement to wireless communication services to reduce latency is the use of Multi-Access Edge Computing (MEC) architecture. The MEC architecture includes devices and associated connections located at the network edge relative to the point of attachment of a wireless user equipment (UE) device to a wireless communication network via a base station. Thus, the MEC network may be located in geographic proximity to the base station and be close to the base station from a network topology perspective. The devices in a MEC network may implement services previously implemented in a core network and/or a cloud computing center and enable processing to be offloaded from the core network and/or cloud computing center at a reduced latency. However, a particular MEC network, also referred to as a MEC site or a MEC location, may have limited resources. Therefore, a provider of communication services may need to select which services to deploy at a particular MEC network.

Services and/or applications available in a core network and/or cloud computing center may be virtualized. Virtualization has traditionally been implemented using virtual machines. Virtual machines are generated on a physical platform using a virtual machine monitor, also referred to as a hypervisor. Each virtual machine runs its own instance of an operating system (OS), libraries, and binary executable files. However, because each virtual machine includes a separate instance of an operating system, deploying new virtual machines is costly in terms of memory and processing power, adds complexity to a software development cycle, and limits the portability of applications implemented using virtual machines between platforms with different types of physical architectures.

In order to address these issues, container-based virtualization technology has been developed. Container-based virtualization, sometimes referred to as OS-level virtualization, enables multiple isolated user space instances to use the same OS instance and/or kernel space. The isolated user space instances are referred to as containers. A container may have its own set of libraries and binary executable files, and/or its own dedicated share of hardware resources, but may share a kernel space with other containers. Since containers are decoupled from the underlying infrastructure, containers may be portable across cloud center and OS distributions.

Furthermore, the functions of an application or service may be divided into microservices implemented in different containers. In contrast to monolith application architecture in which a user interface interacts directly with the full functionality of the application, a microservices-based design divides particular functions of the application into different microservices, with each microservice performing a particular function of the application and deployed in its own container. Furthermore, a user interface of the application may be configured to interact with application programming interfaces (APIs) of individual microservices, and the individual microservices may be configured to communicate with each other using their respective APIs.

An application that is latency sensitive and/or associated with a set of computation requirements may be designated for deployment at a MEC network in order meet the latency requirements and/or computation requirements of the application. However, deploying all the microservices associated with the application in the MEC network may be inefficient and costly, because not all of the microservices associated with the application may include a latency requirement.

Implementations described herein relate to systems and methods to determine MEC deployment of microservices. A MEC deployment system may be configured to select which microservices associated with an application to deploy in a particular MEC network based on requirements associated with particular microservices and based on capabilities associated with the particular MEC network.

An application running on a UE device may use a set of microservices. The set of microservices may initially be deployed in a cloud computing center. The MEC deployment system may be configured to determine latency budgets for individual microservices from the set of microservices, as well as the computation requirements associated with each microservice. The MEC deployment system may then determine whether a measured latency for a microservice has exceeded the latency budget. For example, the MEC deployment system may measure a network latency for a microservice and a computation time for the microservice and determine that the sum of the measured network latency and computation time exceeds the latency budget by at least a latency budget threshold. The latency and computation time measurements may be obtained for each microservice using a service proxy container deployed with a particular microservice and configured to collect performance metrics for the particular microservice.

The MEC deployment system may generate a list of candidate microservices to be deployed in at a MEC site associated with the UE device (e.g., associated with a base station servicing the UE device) and then filter the candidate list of microservices based on an estimated latency improvement. For example, the MEC deployment system may determine a latency difference between a latency associated with the cloud computing center and a latency associated with the MEC network, and determine whether the latency difference is greater than the amount by which a latency budget for a candidate microservice has been exceeded. If the latency difference is greater than the amount by which the latency budget for the candidate microservice has been exceeded, indicating deploying at the MEC network may result in the microservice meeting its latency budget, the candidate microservice may be deployed at the MEC network.

As another example, the MEC deployment system may determine a computational requirement associated with a candidate microservice and determine whether the MEC network has the computational resources to meet the computational requirement. If the MEC network has the computational resources to meet the computational requirement, the candidate microservice may be deployed at the MEC network.

Furthermore, the MEC deployment system may use additional criteria for selecting a microservice for deployment in a MEC network. For example, the MEC deployment system may determine that a microservice is associated with a security requirement and select to deploy the microservice in a MEC network based on the security requirement. In some implementations, a microservice associated with a security requirement may be deployed in a private MEC network.

The MEC deployment system may further determine a data workflow between the microservices associated with the application and identify dependencies between individual microservices based on the determined data workflow. For example, a second microservice may identified as a dependency microservice with respect to a first microservice if the first microservice depends on an output from the second microservice (e.g., the first microservice makes an API call to the second microservice, etc.). If a first microservice is deployed in a MEC network and a second microservice is identified as a dependency microservice of the first microservice, the second microservice may also be deployed in the MEC network.

The MEC deployment system may deploy candidate microservices that have not been filtered out in a MEC network, associated with a base station servicing UE devices using the application associated with the deployed microservices, and may send a recommendation to a UE device to use the microservices deployed in the MEC network. For example, the MEC deployment system may receive a request from a UE device for a list of available microservices deployed in the MEC network and may provide the requested list of microservices deployed in the MEC network to the UE device. The MEC deployment system may receive an indication from the UE device to use a microservice deployed in the MEC network and may, in response, route protocol data units (PDU) associated with the microservice to the MEC network.

The MEC deployment system may deploy a microservice in a container and may deploy another container that includes a function to collect metrics information associated with the microservice. The MEC deployment system may monitor the performance of the microservice deployed in the MEC network (e.g., by monitoring the latency associated with the microservice, etc.) and determine whether the performance of the microservice in the MEC network has improved with respect to the microservice deployed at the cloud computing center. If the performance of the microservice has not improved, the microservice may be de-deployed in the MEC network in order to conserve resources.

In some implementations, the deployment of a microservice may be transferred from a first MEC network to a second MEC network. For example, the MEC deployment system may determine that an available processing and/or network capacity associated with first MEC network is less than an available capacity threshold and, in response, transferring a deployment of one or more microservices to a second MEC network that has available processing and/or network capacity.

FIG. 1 is a diagram of an exemplary environment 100 in which the systems and/or methods, described herein, may be implemented. As shown in FIG. 1, environment 100 may include UE devices 110-A to 110-N (referred to herein collectively as "UE devices 110" and individually as "UE device 110"), base stations 120-A to 120-M (referred to herein collectively as "base stations 120" and individually as "base station 120"), radio access network (RAN) 130, MEC network 140, MEC devices 145, core network 150, cloud center devices 155, packet data networks (PDNs) 160-A to 1960-Y (referred to herein collectively as "PDNs 160" and individually as "PDN 160"), and application server 170.

UE device 110 may include any device with cellular wireless communication functionality. For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; a global positioning system (GPS) device; a home appliance device; a home monitoring device; and/or any other type of computer device with wireless communication capabilities and a user interface. UE device 110 may include capabilities for voice communication, mobile broadband services (e.g., video streaming, real-time gaming, premium Internet access etc.), best effort data traffic, and/or other types of applications.

In some implementations, UE device 110 may communicate using machine-to-machine (M2M) communication, such as MTC, and/or another type of M2M communication for Internet of Things (IoT) applications. For example, UE device 110 may include a health monitoring device (e.g., a blood pressure monitoring device, a blood glucose monitoring device, etc.), an asset tracking device (e.g., a system monitoring the geographic location of a fleet of vehicles, etc.), a traffic management device (e.g., a traffic light, traffic camera, road sensor, road illumination light, etc.), a climate controlling device (e.g., a thermostat, a ventilation system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, a utility meter, a fault diagnostics device, etc.), a device controlling a financial transaction system (e.g., a point-of-sale terminal, an automated teller machine, a vending machine, a parking meter, etc.), and/or another type of electronic device.

RAN 130 may include base station 120. Base station 120 may include a 5G NR base station (e.g., a gNodeB) and/or a 4G LTE base station (e.g., an eNodeB). Each base station 120 may include devices and/or components configured to enable cellular wireless communication with UE devices 110. For example, base station 120 may include a radio frequency (RF) transceiver configured to communicate with UE devices using a 5G NR air interface using a 5G NR protocol stack, a 4G LTE air interface using a 4G LTE protocol stack, and/or using another type of cellular air interface. Base station 120 may enable communication with core network 150 to enable core network 150 to authenticate UE device 110 with a subscriber management device (e.g., Home Subscriber Server (HSS) in 4G, Unified Data Management (UDM) in 5G, etc.). Furthermore, base station 120 may establish an encrypted wireless communication channel with UE device 110 using session keys generated as part of the authentication process. Base stations 120 may facilitate handovers in RAN 130. For example, UE device 110 may move from a service area of a first base station 120 to the service area of a second base station 120 and a connection may be handed over from the first base station 120 to the second base station 120 in response.

MEC network 140 may include one or more MEC devices 145. MEC devices 145 may provide MEC services to UE devices 110. MEC service may include a microservice associated with a particular application, such as, for example, a user authentication microservice, a navigation microservice, an online shopping microservice, a content delivery microservice, a gaming microservice, a virtual and/or augmented reality microservice, a health monitoring microservice, and/or another type of microservice associated with a low latency requirement. As another example, a MEC microservice may include a microservice associated with a virtualized network function (VNF) of core network 150. As yet another example, a MEC microservice may include a cloud computing service, such as cache storage, use of artificial intelligence (AI) accelerators for machine learning computations, image processing, data compression, locally centralized gaming, use of Graphics Processing Units (GPUs) and/or other types of hardware accelerators for processing of graphics information and/or other types of parallel processing, and/or other types of cloud computing services. As yet another example, a MEC microservice may include a network service, such as authentication, for example via a certificate authority for a Public Key Infrastructure (PKI) system, a local Domain Name System (DNS) service, a virtual network function (VNF), and/or another type of network service. As yet another example, a MEC microservice may include control of IoT devices, such as autonomous vehicles, unmanned aerial drones, a security system, a manufacturing and/or robotics system, and/or another type of IoT system. Furthermore, MEC device 145 may include a MEC deployment system that selects candidate microservices for deployment, deploys selected candidate microservices, collects performance metrics for deployed microservice and analyzes the performance of deployed microservices, performs load balancing by transferring deployment of microservices between different MEC networks 140 at different locations, and/or performs other functions associated with the deployment and management of microservices in MEC network 140.

MEC network 140 may include a public MEC network 140 or a private MEC network 140. For example, a private enterprise may be associated with a private MEC network 140 that provides MEC services for UE devices 110 associated with the private enterprise. Microservices associated with an application managed by the private enterprise may be deployed on the private MEC network 140 associated with the private enterprise.

Core network 150 may be managed by a provider of cellular wireless communication services and may manage communication sessions of subscribers connecting to core network 150 via RAN 130. For example, core network 150 may establish an Internet Protocol (IP) connection between UE devices 110 and PDN 160. Core network 150 may include cloud center devices 155. In other implementations, cloud center devices 155 may be implemented in a separate network connected to and accessible via core network 150. Cloud center devices 155 may be deployed in a cloud computing center and may host microservices, such as microservices described above with respect to MEC network 140. For example, a set of microservices associated with an application may initially be deployed in cloud center device 155 and a MEC deployment system in MEC device 145 may collect performance metrics associated with the set of microservices in order to determine which microservices to deploy in MEC device 145.

In some implementations, core network 150 may include a 5G core network. A 5G core network may include devices that implement network functions (NFs) that include: an Access and Mobility Function (AMF) to perform registration management, connection management, reachability management, mobility management, and/or lawful intercepts; a Session Management Function (SMF) to perform session management, session modification, session release, IP allocation and management, Dynamic Host Configuration Protocol (DHCP) functions, and selection and control of a User plane Function (UPF); a UPF to serve as a gateway to packet data network 160, act as an anchor point, perform packet inspection, routing, and forwarding, perform Class of Service (CoS) handling in the user plane, uplink traffic verification, transport level packet marking, downlink packet buffering, and/or other type of user plane functions; an Application Function (AF) to provide services associated with a particular application; a Unified Data Management (UDM) to manage subscription information, handle user identification and authentication, and perform access authorization; a Policy Control Function (PCF) to support policies to control network behavior, provide policy rules to control plane functions, access subscription information relevant to policy decisions, and perform policy decisions; a Charging Function (CHF) to perform charging and billing functions; a Network Repository Function (NRF) to support service discovery, registration of network function instances, and maintain profiles of available network function instances; a Network Exposure Function (NEF) to expose capabilities and events to other network functions, including third party network functions; a Network Slice Selection Function (NSSF) to select a network slice instance to serve a particular UE device 110; a Network Data Analytics Function (NWDAF) to collect analytics information, such as, for example, a set of Key Performance Indicator (KPI) values associated with RAN 130 and/or core network 150; and/or other types of network functions.

In other implementations, core network 150 may include a 4G LTE core network (e.g., an evolved packet core (EPC) network). An EPC network may include devices that implement network functions that include: a Mobility Management Entity (MME) for control plane processing, authentication, mobility management, tracking and paging, and activating and deactivating bearers; a Serving Gateway (SGW) that provides an access point to and from UE devices, acts as a local anchor point during handovers, and directs gateway to a PDN gateway (PGW); a PGW that functions as a gateway to a particular PDN 190; a Policy and Charging Rules Function (PCRF) that implements policy and charging rules functions, such as establishment of Quality of Service (QoS) requirements, setting allowed bandwidth and/or data throughput limits for particular bearers, and/or other policies; and a Home Subscriber Server (HSS) that stores subscription information for UE devices, including subscription profiles that include authentication and access authorization information, group device memberships, subscription privileges, and/or other types of subscription information.

In some implementations, the 5G and/or 4G NFs described above may be implemented as a set of VNF microservices deployed in cloud center devices 155 and/or MEC devices 145. A MEC deployment system in MEC device 145 may select which VNF microservices are deployed in MEC network 140.

PDNs 160-A to 160-Y may each include a packet data network. A particular PDN 190 may be associated with an Access Point Name (APN) and a UE device may request a connection to the particular packet data network 190 using the APN. PDN 160 may include, and/or be connected to and enable communication with, a local area network (LAN), a wide area network (WAN), a metropolitan area network (MAN), an autonomous system (AS) on the Internet, an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks. PDN 160 may include an application server 170 associated with an application used by UE device 110. Application server 170 may generate and/or manage a set of microservices for the application, request to deploy the set of microservices in cloud center device 155, and direct UE device 110 to use the microservices deployed in cloud center device 155. One or more of the microservices deployed in cloud center device 155 may subsequently be deployed in MEC device 145 based on decisions made by a MEC deployment system in MEC device 145. In some implementations, some or all of the functionality of application server 170 may also be deployed in MEC device 145.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
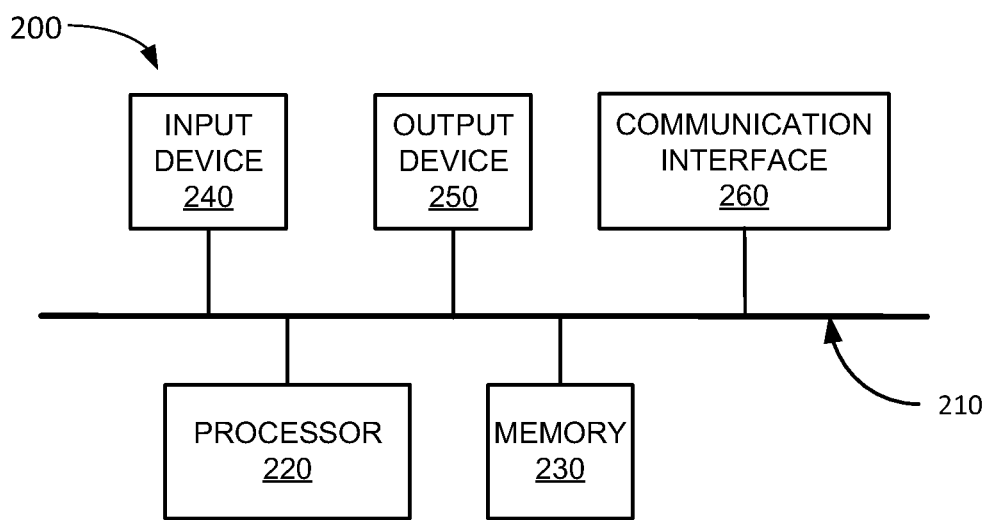
FIG. 2 illustrates exemplary components of a device that may be included in a component of FIG. 1 according to an implementation described herein.

FIG. 2 is a diagram illustrating example components of a device 200 according to an implementation described herein. UE device 110, base station 120, MEC device 145, cloud center device 155, application server 170, and/or any of the components of FIG. 2 may each include, or be implemented on, one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, central processing unit (CPU), graphics processing unit (GPU), neural processing unit (NPU), tensor processing unit (TPU), hardware accelerator, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some implementations, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the user. In some implementations, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to the deployment and/or management of microservices in a MEC network. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally, or alternatively, one or more components of device 200 may perform one or more tasks described as being performed by one or more other components of device 200.

Figure 3:
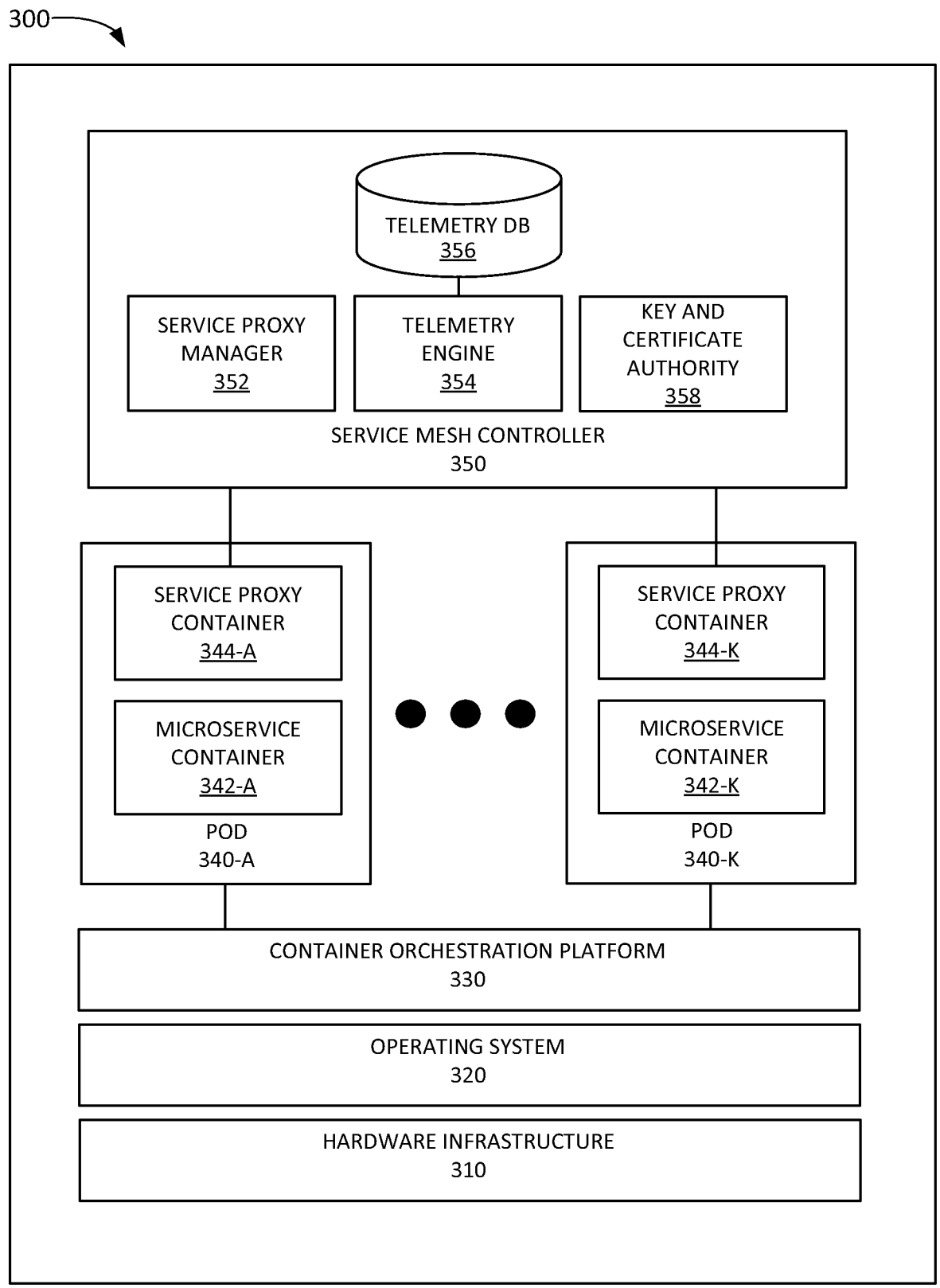
FIG. 3 illustrates exemplary components of a container node according to an implementation described herein.

FIG. 3 is a diagram illustrating exemplary components of a container node 300 used to deploy container-based microservices. As shown in FIG. 3, container node 300 may include a hardware infrastructure 310, an operating system 320, a container orchestration platform 330, and pods 340-A to 340-K (referred to herein collectively as "pods 340" and individually as "pod 340"), and a service mesh controller 360.

Container orchestration platform 330 may be implemented on top of operating system 320 and the underlying hardware infrastructure 310 of cloud center device 155 or MEC device 145. Container orchestration platform 330 may facilitate the creation, configuration, deployment and/or scaling of containers. For example, container orchestration platform 330 may deploy additional instances of a microservice based on increased load and may manage the deployed instances across different physical devices, referred to as nodes. Container orchestration platform 330 may organize containers into groups called pods 340. Pod 340 may guarantee that containers in the pod are collocated in the same node. Examples of container orchestration platforms include Kubernetes (k8s), Docker Swarm, Amazon Elastic Container Service (ECS), Helios, Apache Mesos, Red Hat Open Shift Container Platform, Cloudify, etc.

Pod 340 may include a microservice container 342 and a service proxy container 344. Microservice container 342 may include an instance of a particular microservice. Service proxy container 344 may function as a service proxy for pod 340 by intercepting messages sent to microservice container 342 and/or messages sent by microservice container 342. Service proxy container 344 may enforce load balancing, routing, resiliency, and/or other types of rules received from service proxy manager 362. Moreover, service proxy container 344 may report a set of metrics to telemetry engine 364. The set of metrics may include, for example, a measured network latency associated with the particular microservice, a measured resource use associated with the microservice (e.g., CPU time, GPU time, memory use, etc.), a number of times the microservice was used in a particular time period, the number of different UE devices 110 that used the particular microservice in the particular time period, and/or other types of metrics that may be used to measure the performance of a particular microservice instance.

Service mesh controller 360 may control the service mesh associated with pods 340. When a large number of containers are deployed, communication between the microservices provided by the containers may become complex. Container orchestration platform 330 may not provide the necessary infrastructure for such communication. A service mesh system may be deployed to provide an infrastructure layer to enable communication between container-based microservices. Examples of service mesh systems include Istio, Consul, Kuma, Linkerd, Maesh, Grey Matter, etc. Service mesh controller 360 may include a service proxy manager 362, a telemetry engine 364, a telemetry database (DB) 366, and a key and certificate authority 368.

Service proxy manager 362 may manage the connectivity in a service mesh of microservice containers via service proxy container 344. Service proxy manager 362 may instruct container orchestration platform 330 to inject service proxy container 344 into each pod 340 and may configure service proxy container 344 for managing communications between microservice containers 342 and to report particular performance metrics to telemetry engine 364. For example, service proxy manager 362 may configure load balancing, routing rules, resiliency rules, and/or other communication rules for service proxy container 344.

Telemetry engine 364 may collect telemetry data associated with microservice containers 342 using service proxy container 344 and may store the collected telemetry data in telemetry DB 366. Key and certificate authority 368 may manage keys and certificates in the service mesh. The keys and certificates may be used to establish encrypted communication channels between microservice containers 342.

Although FIG. 3 shows exemplary components of container node 300, in other implementations, container node 300 may include fewer components, different components, differently arranged components, or additional components than depicted in FIG. 3. Additionally, or alternatively, one or more components of container node 300 may perform functions described as being performed by one or more other components container node 300.

Figure 4:
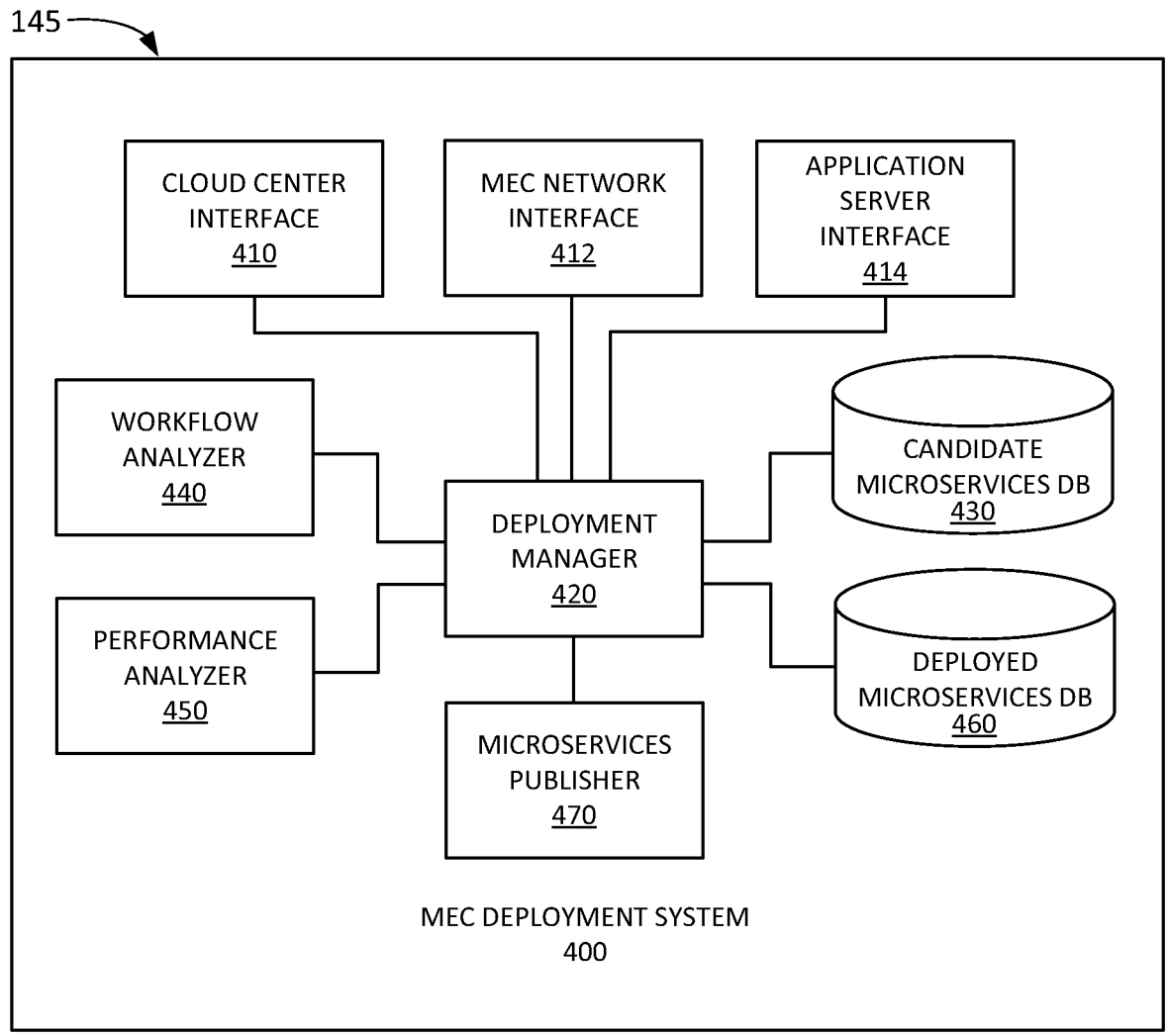
FIG. 4 illustrates exemplary components that may be included in the MEC device of FIG. 1 according to an implementation described herein.

FIG. 4 is a diagram illustrating exemplary components of MEC deployment system 400 implemented in MEC device 145. The components of MEC deployment system 400 may be implemented, for example, via processor 220 executing instructions from memory 230 in MEC device 145. As shown in FIG. 4, MEC deployment system 400 may include a cloud center interface 412, an application server interface 414, a deployment manager 420, a candidate microservices DB 430, a workflow analyzer 440, a performance analyzer 450, a deployed microservices DB 460, a microservices publisher 470, and a MEC network interface 480.

Cloud center interface 410 may be configured to communicate with service mesh controller 360 running on cloud center device 155. For example, cloud center interface 410 may obtain performance metrics associated with microservices deployed in cloud center device 155 from service mesh controller 360. The obtained performance metrics may be used by deployment manager 420 to select candidate microservices for deployment in MEC network 140.

MEC network interface 412 may be configured to communicate with service mesh controller 360 and/or container orchestration platform 330 running on MEC device 145. For example, deployment manager 420 may obtain, via MEC network interface 412, performance metrics associated with microservices deployed in MEC device 145 from service mesh controller 360. As another example, deployment manager 420 may instruct, via MEC network interface 412, container orchestration platform 330 to deploy a particular microservice. Furthermore, MEC network interface 412 may be configured to communicate with other MEC networks 140 to perform load balancing and/or to transfer deployment of a microservice from a first MEC network 140 to a second MEC network 140.

Application server interface 414 may be configured to communicate with application server 170. For example, deployment manager 420 may obtain requirements associated with particular microservices from application server 170 via application server interface 414 and store the obtained requirements in candidate microservices DB 430.

Deployment manager 420 may manage deployment of microservices in MEC devices 145 of MEC network 140. Deployment manager 420 may select candidate microservices to deploy based on the performance of microservices deployed in cloud center devices 155 and based on requirements associated with the deployed microservices obtained from application server 170. For example, if a microservice is not meeting a latency budget (e.g., exceeding a maximum allowed latency by at least a threshold, etc.), deployment manager 420 may select the microservice as a candidate microservice for deployment in MEC device 145 and store information relating to the candidate microservice in candidate microservices DB 430. Exemplary information that may be stored in candidate microservices DB 430 is described below with reference to FIG. 5A.

Deployment manager 420 may filter the candidate microservices based on the capabilities associated with MEC devices 145 in MEC network 140 and based on the computational requirements associated with a particular microservice. For example, if a microservice requires a particular GPU capacity and MEC device 145 does not have the GPU capacity, deployment manager 420 may select not to deploy the microservice in MEC device 145. Deployment manager 420 may further filter candidate microservices based on an estimated latency improvement. For example, deployment manager 420 may select not to deploy a microservice if an estimated latency improvement for the microservice is less than a latency improvement threshold.

Deployment manager 420 may additionally determine a workflow of microservices for a particular application, to identify dependency microservices, using workflow analyzer 440. Workflow analyzer 440 may identify a workflow between the microservices of an application by, for example, monitoring API calls and/or other types of messages exchanged between the microservices of the application. The API calls and/or other types of messages may be logged and reported by service proxy container 344. A second microservice may be designated as a dependency microservice of a first microservice if the first microservice depends on data from the second microservice (e.g., makes API calls to the second microservice, etc.). If the first microservice is deployed in MEC device 145, deployment manager 420 may select to deploy the second microservice in MEC device 145 as well if the second microservice is determined to be a dependency microservice of the first microservice.

Deployment manager 420 may analyze the performance of microservices using performance analyzer 450. Performance analyzer 450 may monitor microservices deployed in MEC device 145 and may determine whether the performance of an instance of a microservice deployed in MEC device 145 satisfies a performance criterion. The performance criterion may include a requirement associated with the microservice, a latency improvement criterion between a MEC deployment and a cloud center deployment, and/or another type of performance requirement.

Deployed microservices DB 460 may store information relating to microservices that have been deployed in MEC network 140. Exemplary information that may be stored in deployed microservices DB 460 is described below with reference to FIG. 5B.

Microservices publisher 470 may publish information relating to microservices deployed in MEC device 145 and stored in deployed microservices DB 460. For example, UE device 110 may request a list of available microservices in MEC network 140 and microservices publisher 470 may provide the requested list to UE device 110. As another example, microservices publisher 470 may determine that UE device 110 uses an application, may determine that a microservice associated with the application has been deployed in MEC network 140, and may recommend to UE device 110 to use the microservice deployed in MEC network 140.

Although FIG. 4 shows exemplary components of MEC deployment system 400, in other implementations, MEC deployment system 400 may include fewer components, different components, differently arranged components, or additional components than depicted in FIG. 4. Additionally, or alternatively, one or more components of MEC deployment system 400 may perform functions described as being performed by one or more other components of MEC deployment system 400. For example, in some implementations, MEC deployment system 400 may be deployed at a carrier gateway device. The carrier gateway device may be operated by a cloud service provider and/or a mobile network operator and implemented in cloud center device 155.

Figure 5A:
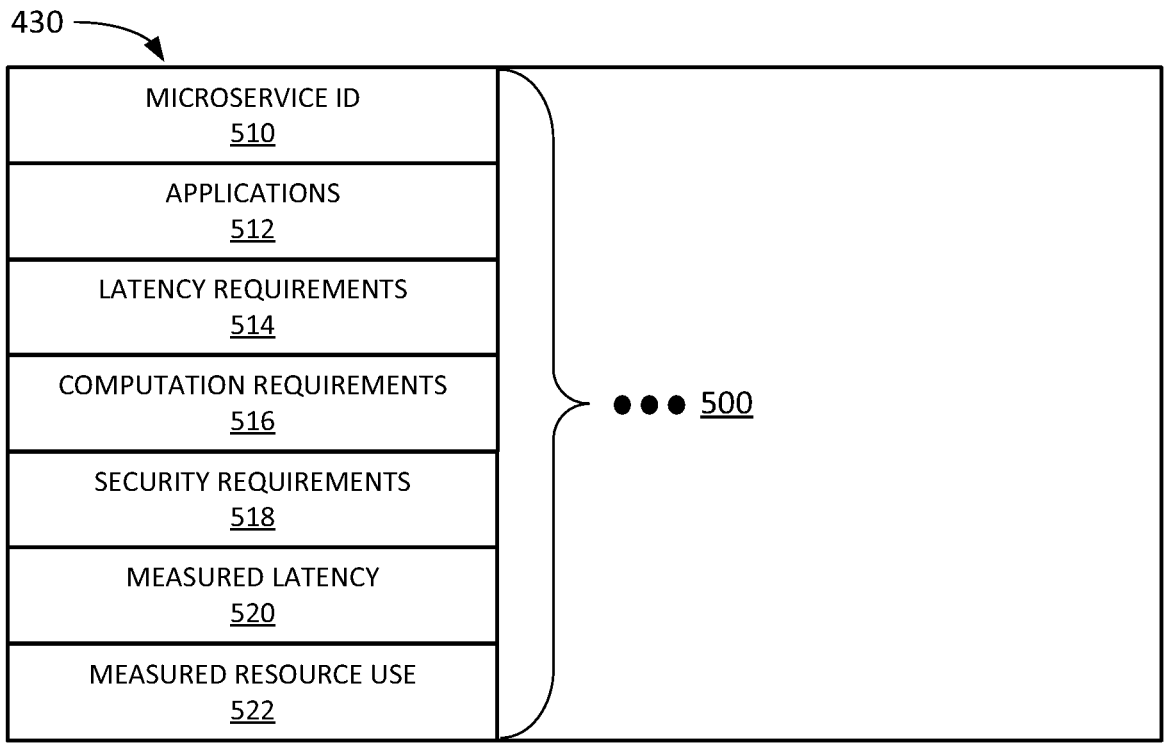
FIG. 5A illustrates exemplary components of the candidate microservices database (DB) of FIG. 4 according to an implementation described herein.

FIG. 5A is a diagram illustrating exemplary information stored in candidate microservices DB 430. As shown in FIG.

5A, candidate microservices DB 430 may include one or more microservice records 500. Each microservice record 500 may store information relating to a particular microservice determined to be a candidate for deployment in a MEC network 140. Microservice record 500 may include a microservice identifier (ID) field 510, an applications field 512, a latency requirements field 514, a computation requirements field 516, a security requirements field 518, a measured latency field 520, and a measured resource field 522.

Microservice ID field 510 may include an ID associated with a microservice. Applications field 512 may store information identifying one or more applications that use the microservice. Latency requirements field 514 may store a latency requirement or latency budget associated with the microservice. Computation requirements field 516 may store one or more computational requirements associated with the microservice, such as, for example, a CPU requirement, a GPU requirement, a memory requirement, and/or another type of computational requirement. Security requirements field 518 may store information identifying whether the microservice is associated with a security requirement. As an example, the security requirement may indicate that data associated with the microservice should not be stored in a cloud center. As another example, the security requirement may indicate that the microservice should be deployed in a private MEC network.

Measured latency field 520 may store information relating to a measured latency associated with the microservice when deployed in cloud center device 155. The measured latency may include a measured network latency, such as an amount of time for a data unit to travel from UE device 110 to microservice container 342 and/or an amount of time for a data unit to travel from microservice container 342 to UE device 110. Furthermore, the measured latency may include a computation time associated with the microservice, such as an amount of time to respond to a request from UE device 110 and/or from another microservice. Measured resource field 522 may store information relating to a measured resource use associated with the microservice when deployed in cloud center device 155, such as, for example, a measured CPU time, a measured GPU time, a measured memory use, a measured bandwidth use, and/or another type of measured resource use associated with the microservice.

Although FIG. 5A shows exemplary components of candidate microservices DB 430, in other implementations, candidate microservices DB 430 may include fewer components, different components, additional components, or differently arranged components than depicted in FIG. 5A.

Figure 5B:
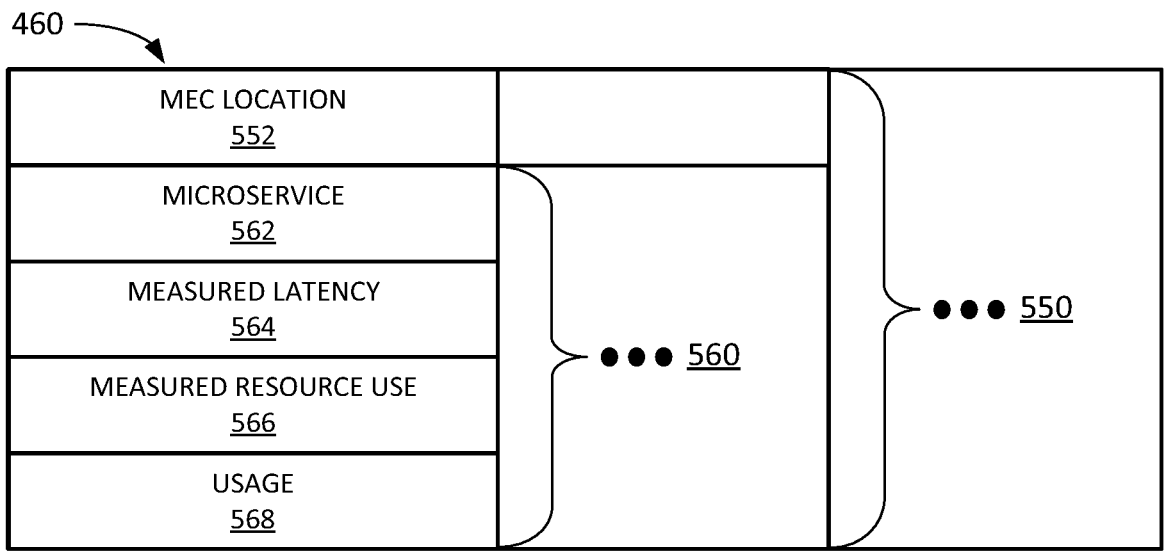
FIG. 5B illustrates exemplary components of the deployed microservices DB of FIG. 4 according to an implementation described herein.

FIG. 5B is a diagram illustrating exemplary information stored in deployed microservices DB 460. As shown in FIG. 5B, deployed microservices DB 460 may include one or more MEC location records 550. Each MEC location record 550 may store information relating to a particular MEC network 140 (also referred to as a "MEC location"). MEC location record 550 may include one or more microservice records 560. Each microservice record 560 may store information relating to a microservice deployed at the MEC location. Microservice record 560 may include a microservice ID field 562, a measured latency field 564, a measured resource use field 566, and a usage field 568.

Microservice ID field 562 may include an ID associated with a microservice. Measured latency field 564 may store information relating to a measured latency associated with the microservice when deployed in MEC device 145. The measured latency may include a measured network latency, such as an amount of time for a data unit to travel from UE device 110 to microservice container 342 and/or an amount of time for a data unit to travel from microservice container 342 to UE device 110. Furthermore, the measured latency may include a computation time associated with the microservice, such as an amount of time to respond to a request from UE device 110 and/or from another microservice.

Measured resource use field 566 may store information relating to a measured resource use associated with the microservice when deployed in MEC device 145, such as, for example, a measured CPU time, a measured GPU time, a measured memory use, a measured bandwidth use, and/or another type of measured resource use associated with the microservice.

Usage field 568 may store information relating to the usage of the microservice. For example, usage field 568 may store information identifying a number of times the microservice was used in a particular time period, the number of different UE devices 110 that used the microservice in the particular time period, information identifying particular UE devices 110 using the microservice during the particular time period, and/or other types of usage information associated with the microservice.

Although FIG. 5B shows exemplary components of deployed microservices DB 460, in other implementations, deployed microservices DB 460 may include fewer components, different components, additional components, or differently arranged components than depicted in FIG. 5B.

Figure 6:
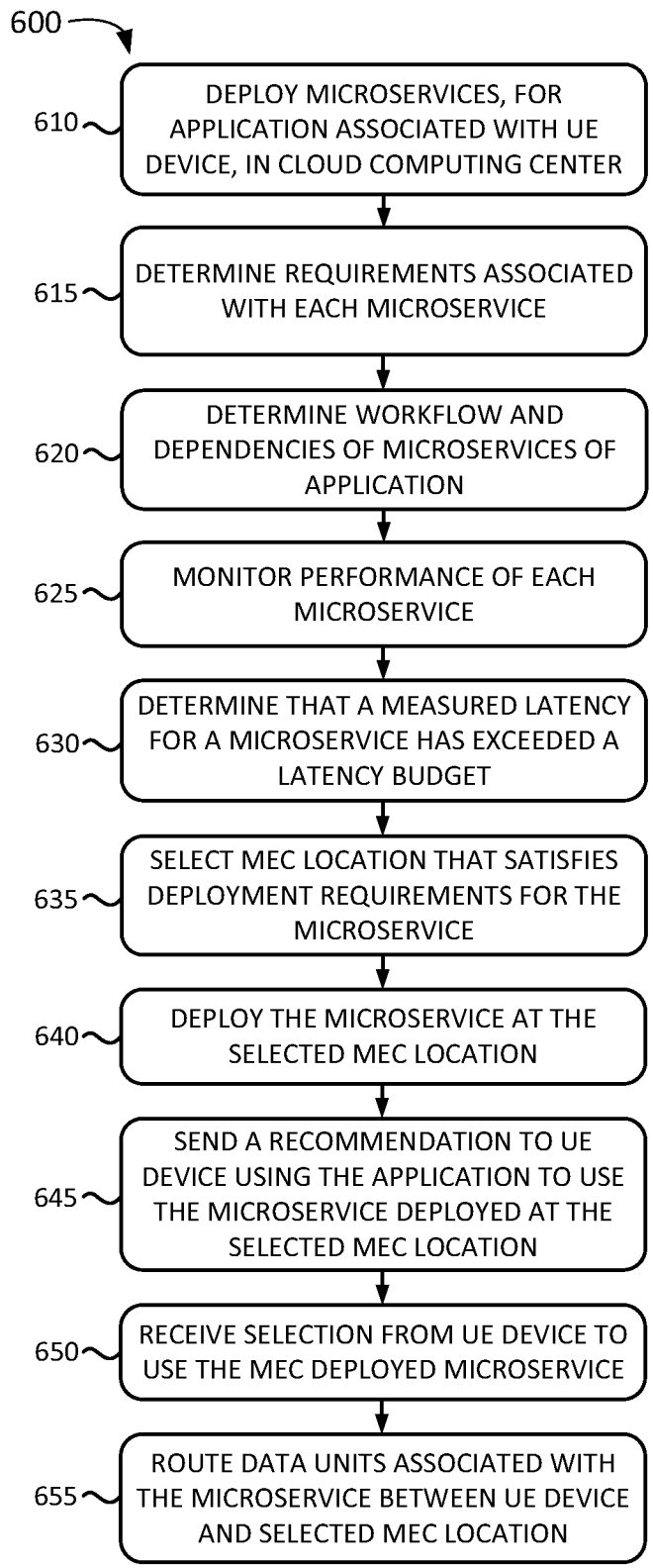
FIG. 6 illustrates a first flowchart for deploying microservices according to an implementation described herein.

FIG. 6 illustrates a flowchart of a first process 600 for deploying microservices according to an implementation described herein. In some implementations, process 600 of FIG. 6 may be performed by MEC device 145. In other implementations, some or all of process 600 may be performed by another device or a group of devices separate from MEC device 145.

As shown in FIG. 6, process 600 may include deploying microservices, for an application associated with a UE device, in a cloud computing center (block 610). For example, application server 170 may request that a set of microservices associated with an application managed by application server 170 be deployed in a cloud center that includes cloud center devices 155. The microservices may be deployed in microservice containers 342 along with service proxy containers 344 that monitor the performance of each microservice.

Process 600 may further include determining requirements associated with each microservice (block 620), determining workflow and dependencies of microservices of the application (block 630), and monitoring the performance of each microservice (block 640). For example, MEC deployment system 400 may obtain requirements associated with each microservice from application server 170 (and/or from cloud center device 155), such as a latency budget (e.g., a maximum allowed latency) for each microservice, computational requirements associated with each microservice (e.g., CPU requirements, GPU requirements, memory requirements, network bandwidth requirements, etc.), security requirements associated with each microservice (e.g., whether data associated with a microservice has a privacy requirement, whether the microservice has an encryption requirement, whether data associated with the microservice is permitted to be sent via a public network, etc.), and/or other types of requirements associated with a microservice.

MEC deployment system 400 may further map out a data workflow between the set of microservices associated with the application to determine dependency microservices for each microservice. For example, if a first microservice calls a second microservice (e.g., using an API associated with the second microservice) before responding to an API call, the second microservice may be designated as a dependency microservice for the first microservice. Dependency microservices of a microservice may be deployed together with the microservice in MEC device 145 in order to maintain a latency improvement resulting from a MEC deployment of a microservice. MEC deployment system 400 may then monitor the performance of each microservice deployed in cloud center device 155 to determine whether requirements for each microservice are being satisfied (e.g., to make sure a microservice is not exceeding a latency budget). MEC deployment system 440 may monitor the performance of each microservice by receiving performance reports from service mesh controller 350 running in cloud center device 155.

Process 600 may further include determining that a measured latency for a microservice has exceeded a latency budget (block 635), selecting a MEC location that satisfies deployment requirements for the microservice (block 640), and deploying the microservice at the selected MEC location (block 640). For example, MEC deployment system 400 may determine that a microservice deployed in cloud center device 155 has exceeded a latency budget by at least a latency budget threshold, may determine that MEC device 145 has available computational capacity to meet the computation requirements associated with the microservice, and may deploy the microservice in MEC device 145 by instructing container orchestration system 330 in MEC device 145 to deploy an instance of the microservice.

Process 600 may further include sending a recommendation, to the UE device using the application, to use the microservice deployed at the selected MEC location (block 645). For example, MEC deployment system 400 may send a recommendation to UE device 110 to use the deployed instance of the microservice in MEC device 145. As another example, MEC deployment system 400 may add the microservice to a list of deployed microservices associated with MEC network 140.

Process 600 may further include receiving a selection from the UE device to use the MEC deployed microservice (block 650) and routing data units associated with the microservice between the UE device and the MEC location (block 655). For example, UE device 110 may select to use the microservice in MEC device 145. In response, the client application in UE device 110 may start to generate API calls associated with the microservice using an address of MEC device 145. As another example, a switching and/or routing device in RAN 130 may be configured to route data units associated with the microservice from UE device 110 to MEC network 140. UE device 110 may, when selecting to invoke a microservice deployed in MEC device 145 and when multiple MEC networks 140 are advertised to UE device 110 as hosting the microservice, select a particular MEC network 140 that is closest to UE device 110 and/or provides the best performance. For example, UE device 110 may perform a latency check, a battery consumption check, and/or another type of check to determine which MEC network 140 enables UE device 110 to maximize its performance with respect to the microservice. UE device 110 may the select MEC network 140 that maximizes performance (e.g., MEC network 140 with the lowest latency with respect to UE device 110) for invoking the functions of the microservice.

Figure 7:
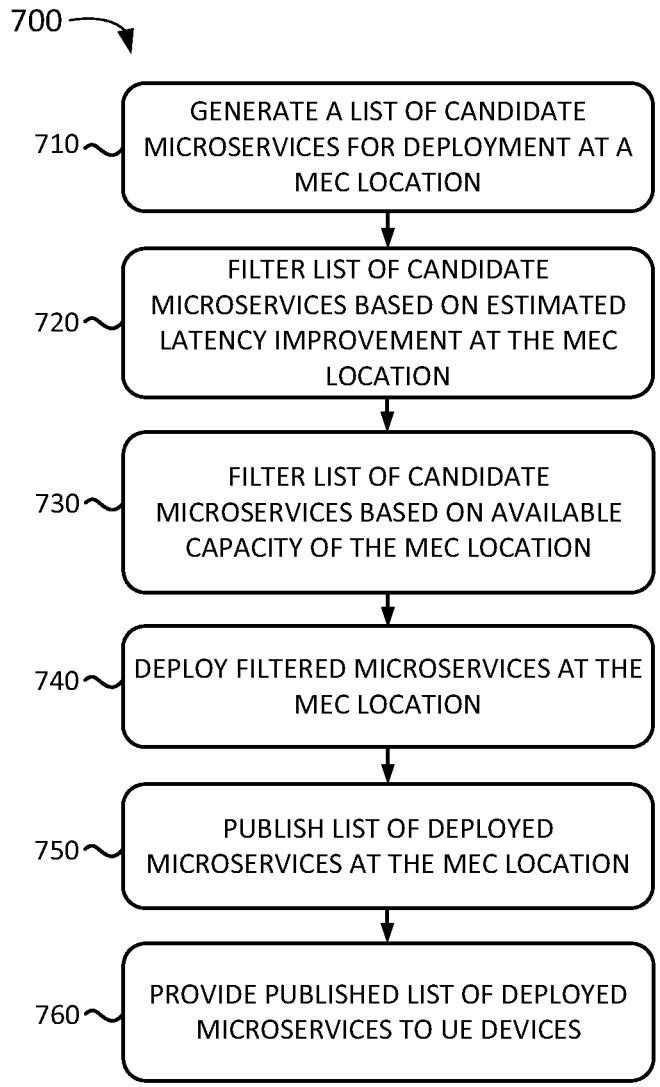
FIG. 7 illustrates a second flowchart for deploying microservices according to an implementation described herein.

FIG. 7 illustrates a flowchart of a second process 700 for deploying microservices according to an implementation described herein. In some implementations, process 700 of FIG. 7 may be performed by MEC device 145. In other implementations, some or all of process 700 may be performed by another device or a group of devices separate from MEC device 145.

As shown in FIG. 7, process 700 may include generating a list of candidate microservices for deployment at a MEC location (block 710). For example, MEC deployment system 400 may select candidate microservices to deploy based on the performance of microservices deployed in cloud center devices 155 and based on requirements associated with the deployed microservices obtained from application server 170. For example, if a microservice is not meeting a latency budget (e.g., exceeding a maximum allowed latency by at least a threshold, etc.), MEC deployment system 400 may select the microservice as a candidate microservice for deployment in MEC device 145 and store information relating to the candidate microservice in candidate microservices DB 430.

Process 700 may further include filtering the candidate list of microservices based on an estimated latency improvement at the MEC location (block 720) and filtering the candidate list of microservices based on available capacity of the MEC location (block 730). For example, MEC deployment system 400 may filter the candidate microservices based on the capabilities associated with MEC devices 145 in MEC network 140 and based on the computational requirements associated with a particular microservice. For example, if a microservice requires a particular GPU capacity and MEC device 145 does not have the available GPU capacity, MEC deployment system 400 may select not to deploy the microservice in MEC device 145. MEC deployment system 400 may further filter candidate microservices based on an estimated latency improvement. For example, MEC deployment system 400 may select not to deploy a microservice if an estimated latency improvement for the microservice is less than a latency improvement threshold.

Process 700 may further include deploying the filtered candidate microservices at the MEC location (block 740), publishing a list of deployed microservices at the MEC location (block 750), and providing the published list of deployed microservices to UE devices (block 760). For example, MEC deployment system 400 may generate a list of deployed microservices associated with MEC network 140 and may publish the generated list to UE devices 110 and/or provide the generated list to UE devices 110 upon request.

MEC deployment system 400 may continue to monitor the performance of the microservices deployed in MEC device 140. If a particular microservice has a performance that is not an improvement with respect to an instance of the microservice deployed in cloud center device 155 (e.g., a latency improvement that is less than a latency improvement threshold), or if the particular microservice is not used enough (e.g., the microservice is accessed less than a particular number of times during a time period), MEC deployment system 400 may select to de-deploy the particular microservice from MEC device 145. Furthermore, MEC deployment system 400 may monitor an available capacity of MEC network 140. If MEC deployment system 400 determines that the available capacity of MEC network 140 is less than an available capacity threshold, MEC deployment system 400 may transfer one or more microservices to another MEC network 140 that has more available capacity.

Figure 8:
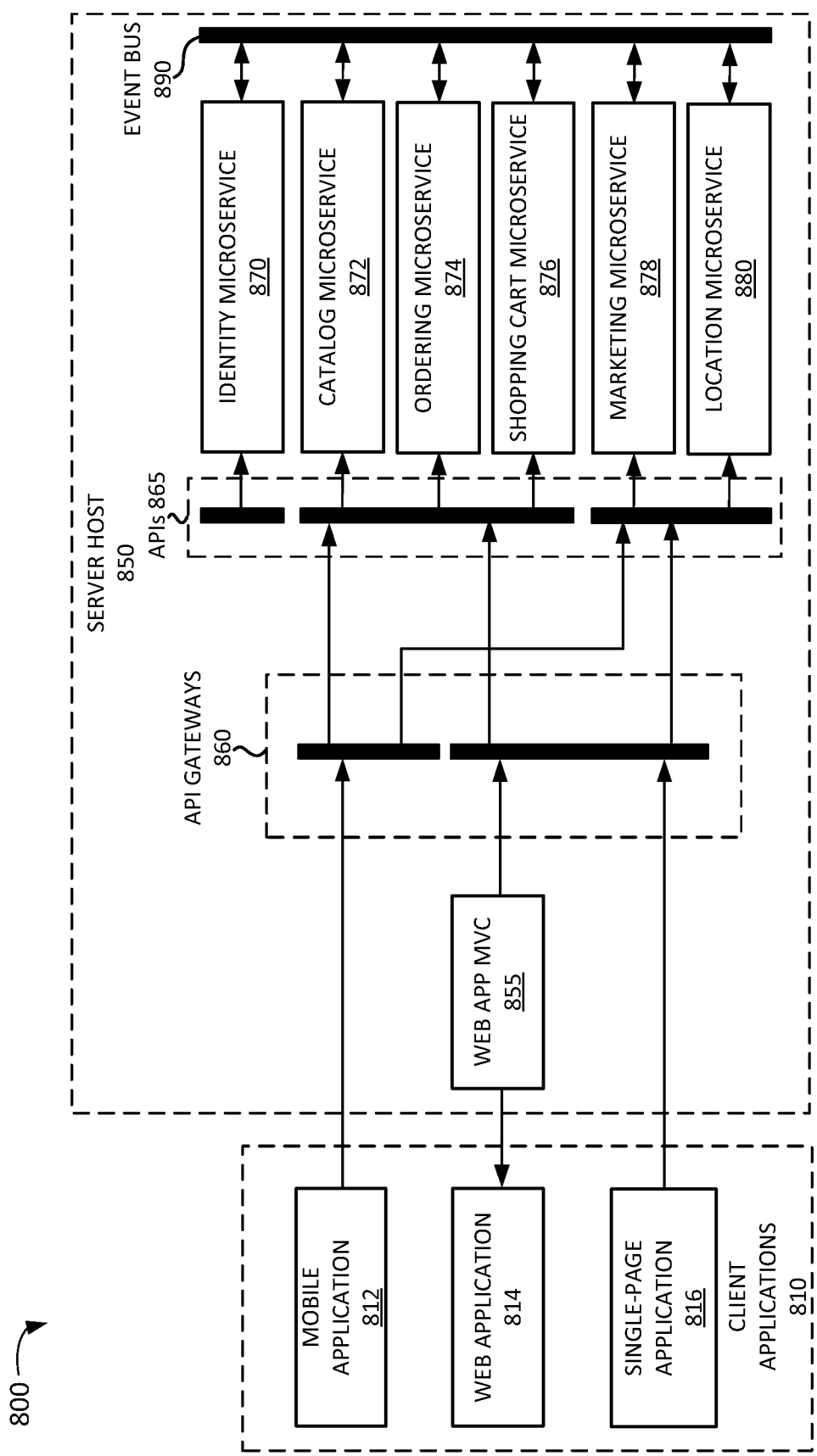
FIG. 8 illustrates an exemplary set of microservices associated with an application before MEC deployment according to an implementation described herein.

FIG. 8 illustrates an exemplary system 800 of microservices associated with an application before MEC deployment according to an implementation described herein. As show in FIG. 8, system 800 may be associated with an online shopping application. The online shopping application may be associated with different client applications, including a mobile application 812, a web application 814, and a single page application 816. Mobile application 812 may be optimized for mobile devices. Web application 814 may use a model-view-controller application 855 at the back end of server host 850 that separates application into a model component, a view component, and a controller component. Single-page application 816 may function by dynamically rewriting a currently displayed web page with new data from server host 850 rather than loading new pages. Each of mobile application 812, web application 814, and single-page application 816 may use a set of API gateways 860 to access a set of microservices via APIs 865 associated with the microservices.

The microservices used by the applications may include an identity microservice 870, a catalog microservice 872, an ordering microservice 874, a shopping cart microservice 876, a marketing microservice 878, and a location microservice 880. The microservices may be deployed in microservice containers 342 in cloud center device 155 and may communicate via event bus 890. Event bus 890 may be implemented via service proxy container 844. Identity microservice 870 may perform identity authentication for user accessing services associated with the online shopping application. Catalog microservice 872 may manage a catalog of products and/or services associated with the online shopping application. Ordering microservice 874 may manage an order processing associated with the online shopping application. Shopping cart microservice 876 may manage an online shopping cart associated with the online shopping application. Marketing microservice 878 may manage advertising functions associated with the online shopping application. Location microservice 880 may perform location and/or navigation services associated with the online shopping application.

Figure 9:
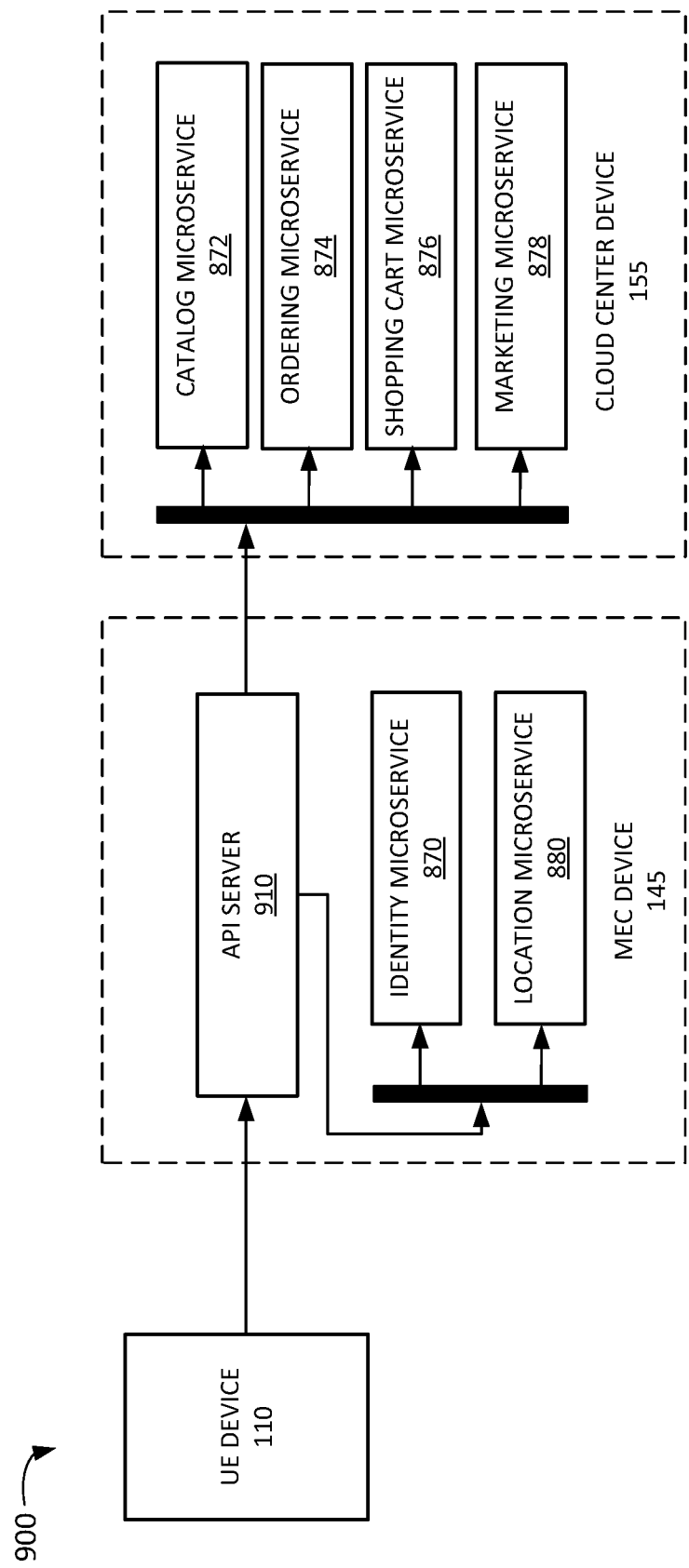
FIG. 9 illustrates the exemplary deployment of the microservices of FIG. 8 according to an implementation described herein.

FIG. 9 illustrates the exemplary system 900 of microservices after MEC deployment according to an implementation described herein. MEC deployment system 400 may identify identity microservice 870 and location microservice 800 as being associated with a latency budget that has been exceeded when identity microservice 870 and location microservice 800 are deployed in cloud center device 155. Therefore, MEC deployment system 400 may deploy identity microservice 870 and location microservice 880 on MEC device 145.

As shown in FIG. 9, system 900 may include identity microservice 870 and location microservice 880 being deployed in MEC device 145 and catalog microservice 872, ordering microservice 874, shopping cart microservice 876, and marketing microservice 878 may remain deployed in cloud center device 155. API server 910 may be deployed in MEC device 910 as a microservice and may process API calls for the microservices associated with the online shopping application. While not shown in FIG. 9, instances of identity microservice 870 and location microservice 880 may continue to be deployed in cloud center device 155 as backup or in cases when UE device 110 cannot or selects not to use the deployments in MEC device 145 (e.g., when UE device 110 is in a location without access to MEC network 140).

Figure 10:
FIG. 10 illustrates an exemplary microservices table according to an implementation described herein.

FIG. 10 illustrates an exemplary microservices table 1000 according to an implementation described herein. Microservices table 1000 may be generated by microservices publisher 470 based on information stored in deployed microservices DB 460 and provided to UE devices 110. As shown in FIG. 10, microservices table 1000 may include a MEC location field 552, a microservice field 562, a latency field 564, a CPU usage field 1010, a GPU usage field 1020, a memory usage field 1030, an access statistics (stats) field 1040, and an associated UEs field 1050.

Each entry of MEC location field 552 may include information identifying a particular MEC network 140. Each corresponding entry in microservice field 562 may include information identifying a microservice deployed in the particular MEC network 140. Each corresponding entry in latency field 564 may include information identifying a measured latency associated with the microservice. Each corresponding entry in CPU usage field 1010 may include information identifying a measured CPU usage associated with the microservice. Each corresponding entry in GPU usage field 1020 may include information identifying a measured GPU usage associated with the microservice. Each corresponding entry in memory usage field 1030 may include information identifying a measured memory usage associated with the microservice. Each corresponding entry in access stat field 1040 may include information identifying the number of times the microservice has been used within a particular time period (e.g., the last 24 hours, etc.). Each corresponding entry in associated UEs field 1050 may include information identifying UE devices 110 using the microservice during a particular time period. Information in associated UEs field 1050 may not be provided to UE devices 110 but may be maintained for usage monitoring purposes.

Figure 11:
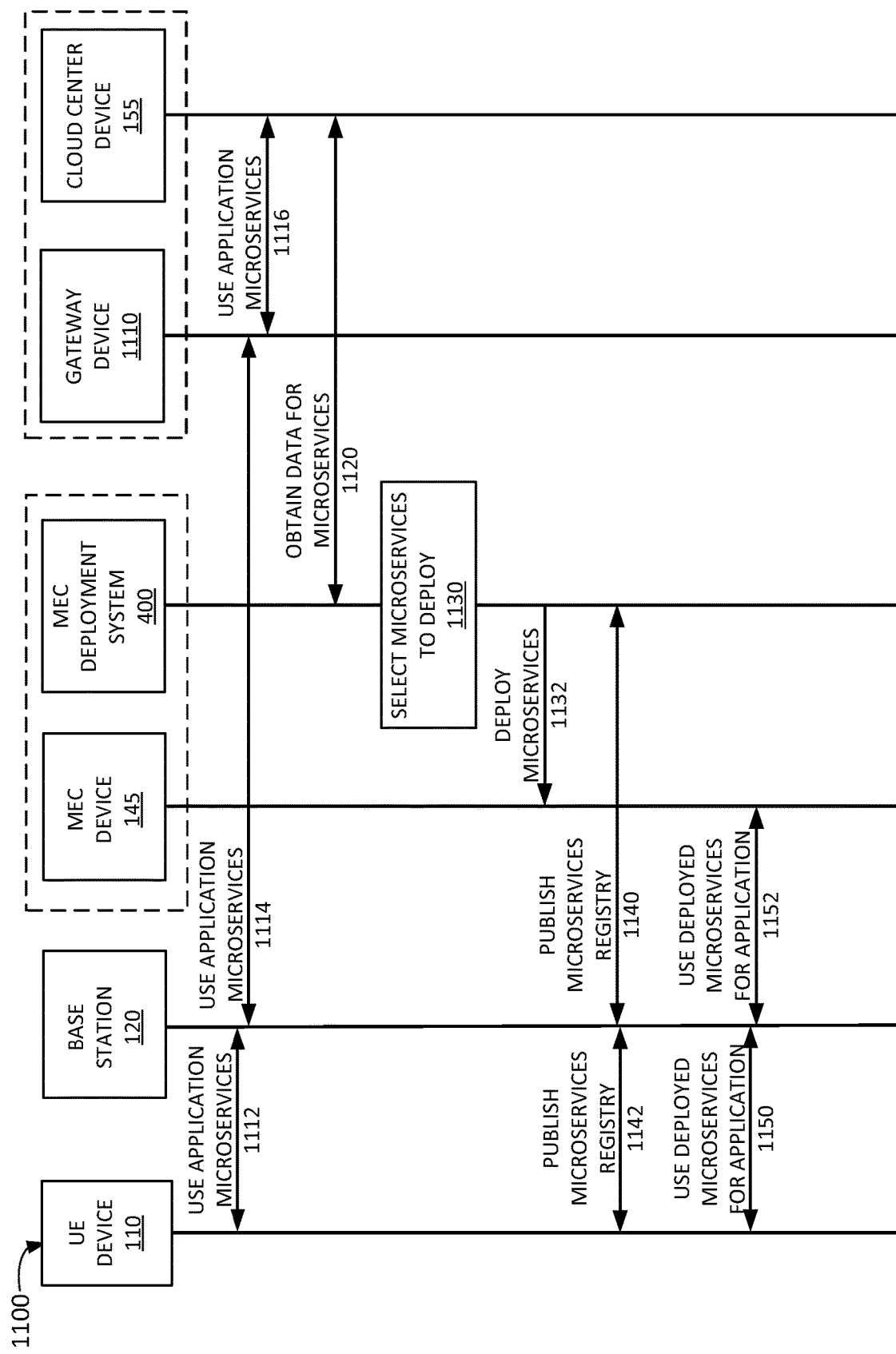
FIG. 11 illustrates an exemplary signal flow according to an implementation described herein.

FIG. 11 illustrates an exemplary signal flow 1100 according to an implementation described herein. As shown in FIG. 11, signal flow 1100 may include UE device 110 using microservices associated with an application that have been deployed in a cloud center that includes cloud center device 155 and is accessed via a gateway device 1110 (signals 1112, 1114, and 1116). MEC deployment system 400 in MEC network 140 may obtain performance data associated with the microservices deployed in cloud center device 155 (signal 1120). MEC deployment system 400 may also obtain requirements (e.g., latency budget, computation requirements, etc.) associated with the microservices from application server 170 (not shown in FIG. 11).

MEC deployment system 400 may select to deploy a subset of the microservices associated with the application in MEC device 145 (block 1130). For example, MEC deployment system 400 may select microservices, associated with a latency budget, that have exceeded a latency budget threshold and that are associated with a computational requirement that can be satisfied by the available computational capacity of MEC device 145. MEC deployment system 400 may instruct container orchestration platform 330 in MEC device 145 to deploy the selected set of microservices in MEC device 145 (signal 1132).

MEC deployment system 400 may then publish a list of deployed microservices in MEC device 145 (signals 1140 and 1142). For example, UE device 110 may request a list of available microservices in MEC network 140 and MEC deployment system 400 may respond with a list of available microservices along with performance metrics associated with the available microservices (e.g., microservices table 1000). In response, UE device 110 may select to use one or more of the deployed microservices in MEC device 145 for the application (signals 1150 and 1152).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 6 and 7, and a series of signals have been described with respect to FIG. 11, the order of the blocks, and/or signals, may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
    determining, by a device, latency budgets for particular ones of a plurality of microservices for an application associated with a user equipment (UE) device, wherein the plurality of microservices are deployed in a cloud computing center;
    determining, by the device, that a measured latency for a particular microservice, of the plurality of microservices, has exceeded a latency budget for the particular microservice by at least a latency budget threshold while the particular microservice is deployed in the cloud computing center, wherein the measured latency is based on a measured network latency for the particular microservice and a measured computation time for the particular microservice;
    determining, by the device, that deploying the particular microservice on a Multi-Access Edge Computing (MEC) network associated with a base station servicing the UE device, reduces the measured latency for the particular microservice to be within the latency budget for the particular microservice, wherein determining that deploying the particular microservice on the MEC network reduces the measured latency for the particular microservice to be within the latency budget for the particular microservice includes:
        determining a latency difference between a latency associated with the cloud computing center and a latency associated with the MEC network; and
        determining that the latency difference is greater than an amount by which the latency budget for the particular microservice has been exceeded;
    deploying, by the device, the particular microservice on the MEC network, based on determining that deploying the particular microservice on the MEC network reduces the measured latency for the particular microservice to be within the latency budget for the particular microservice; and
    sending, by the device, a recommendation to the UE device to use the particular microservice deployed at the MEC network.

2. The method of claim 1, further comprising:
    determining a computation requirement associated with the particular microservice; and
    determining that the MEC network satisfies the computation requirement associated with the particular microservice before deploying the particular microservice in the MEC network.

3. The method of claim 1, wherein determining that the measured latency for the particular microservice has exceeded the latency budget for the particular microservice by at least the latency budget threshold includes:
    determining the measured latency for the particular microservice as a sum of the measured network latency for the particular microservice and the measured computation time for the particular microservice.

4. The method of claim 1, further comprising:
    determining a data workflow between particular ones of the plurality of microservices;
    identifying one or more dependency microservices for the particular microservice, wherein the particular microservice depends on output from the one or more dependency microservices to perform a function; and deploying the one or more dependency microservices in the MEC network, in response to identifying the one or more dependency microservices.

5. The method of claim 1, further comprising:
determining that another microservice, of the plurality of microservices, is associated with a security requirement; and
deploying the other microservice in the MEC network, based on determining that the other microservice is associated with a security requirement.

6. The method of claim 1, wherein the MEC network corresponds to a private MEC network.

7. The method of claim 1, further comprising:
receiving an indication from the UE device to use the deployed particular microservice for the application in the MEC network; and
routing protocol data units (PDU) associated with the particular microservice for the application to the MEC network, in response to receiving the indication from the UE device to use the deployed particular microservice for the application in the MEC network.

8. The method of claim 7, further comprising:
monitoring a latency associated with the deployed particular microservice in the MEC network; and
determining whether the monitored latency is lower than a latency associated with a deployment of the particular microservice in the cloud computing center.

9. The method of claim 1, further comprising:
receiving a request from the UE device for a list of available microservices deployed in the MEC network; and
providing the requested list of available microservices deployed in the MEC network to the UE device.

10. The method of claim 1, further comprising:
determining that an available processing or network capacity associated with the MEC network is less than an available capacity threshold; and
transferring the particular microservice to another MEC network, based on determining that the available processing or network capacity associated with the MEC network is less than the available capacity threshold.

11. The method of claim 1, wherein the particular microservice is deployed in a container, and wherein the container is associated with another container that includes a function to collect metrics information associated with the particular microservice.

12. A device comprising:
a processor configured to execute instructions to:
determine latency budgets for particular ones of a plurality of microservices for an application associated with a user equipment (UE) device, wherein the plurality of microservices are deployed in a cloud computing center;
determine that a measured latency for a particular microservice, of the plurality of microservices, has exceeded a latency budget for the particular microservice by at least a latency budget threshold while the particular microservice is deployed in the cloud computing center, wherein the measured latency is based on a measured network latency for the particular microservice and a measured computation time for the particular microservice;
determine that deploying the particular microservice on a Multi-Access Edge Computing (MEC) network associated with a base station servicing the UE device, reduces the measured latency for the particular microservice to be within the latency budget for the particular microservice, wherein, when determining that deploying the particular microservice on the MEC network reduces the measured latency for the particular microservice to be within the latency budget for the particular microservice, the processor is further configured to:
determine a latency difference between a latency associated with the cloud computing center and a latency associated with the MEC network; and
determine that the latency difference is greater than an amount by which the latency budget for the particular microservice has been exceeded;
deploy the particular microservice on the MEC network, based on determining that deploying the particular microservice on the MEC network reduces the measured latency for the particular microservice to be within the latency budget for the particular microservice; and
send a recommendation to the UE device to use the particular microservice deployed at the MEC network.

13. The device of claim 12, wherein the processor is further configured to:
determine a computation requirement associated with the particular microservice; and
determine that the MEC network satisfies the computation requirement associated with the particular microservice before deploying the particular microservice in the MEC network.

14. The device of claim 12, wherein, when determining that the measured latency for the particular microservice has exceeded a latency budget for the particular microservice by at least the latency budget threshold, the processor is further configured to:
determine the measured latency for the particular microservice as a sum of the measured network latency for the particular microservice and the measured computation time for the particular microservice.

15. The device of claim 12, wherein the processor is further configured to:
determine a data workflow between particular ones of the plurality of microservices;
identify one or more dependency microservices for the particular microservice, wherein the particular microservice depends on output from the one or more dependency microservices to perform a function; and
deploy the one or more dependency microservices in the MEC network, in response to identifying the one or more dependency microservices.

16. The device of claim 12, wherein the processor is further configured to:
determine that another microservice, of the plurality of microservices, is associated with a security requirement; and
deploy the other microservice in the MEC network, based on determining that the other microservice is associated with a security requirement.

17. The device of claim 12, wherein the processor is further configured to:
receive an indication from the UE device to use the deployed particular microservice for the application in the MEC network; and
route protocol data units (PDU) associated with the particular microservice for the application to the MEC network, in response to receiving the indication from the UE device to use the deployed particular microservice for the application in the MEC network.

18. The device of claim 12, wherein the processor is further configured to:
  receive a request from the UE device for a list of available microservices deployed in the MEC network; and
  provide the requested list of available microservices deployed in the MEC network to the UE device.

19. A non-transitory computer-readable memory device storing instructions executable by a processor, the non-transitory computer-readable memory device comprising:
  one or more instructions to determine latency budgets for particular ones of a plurality of microservices for an application associated with a user equipment (UE) device, wherein the plurality of microservices are deployed in a cloud computing center;
  one or more instructions to determine that a measured latency for a particular microservice, of the plurality of microservices, has exceeded a latency budget for the particular microservice by at least a latency budget threshold while the particular microservice is deployed in the cloud computing center, wherein the measured latency is based on a measured network latency for the particular microservice and a measured computation time for the particular microservice;
  one or more instructions to determine that deploying the particular microservice on a Multi-Access Edge Computing (MEC) network associated with a base station servicing the UE device, reduces the measured latency for the particular microservice to be within the latency budget for the particular microservice, wherein the one or more instructions to determine that deploying the particular microservice on the MEC network reduces the measured latency for the particular microservice to be within the latency budget for the particular microservice includes:
    one or more instructions to determine a latency difference between a latency associated with the cloud computing center and a latency associated with the MEC network; and
    one or more instructions to determine that the latency difference is greater than an amount by which the latency budget for the particular microservice has been exceeded;
  one or more instructions to deploy the particular microservice on the MEC network, based on determining that deploying the particular microservice on the MEC network reduces the measured latency for the particular microservice to be within the latency budget for the particular microservice; and
  one or more instructions to send a recommendation to the UE device to use the particular microservice deployed at the MEC network.

20. The non-transitory computer-readable memory device of claim 19, further comprising:
  one or more instructions to determine a data workflow between particular ones of the plurality of microservices;
  one or more instructions to identify one or more dependency microservices for the particular microservice, wherein the particular microservice depends on output from the one or more dependency microservices to perform a function; and
  one or more instructions to deploy the one or more dependency microservices in the MEC network, in response to identifying the one or more dependency microservices.

* * * * *